United States Patent [19]

Nalbach

[11] Patent Number: 4,865,181

[45] Date of Patent: Sep. 12, 1989

[54] ARTICLE ORIENTING APPARATUS

[75] Inventor: John C. Nalbach, Western Springs, Ill.

[73] Assignee: John R. Nalbach Engineering Co., Inc., Chicago, Ill.

[21] Appl. No.: 194,501

[22] Filed: May 11, 1988

[51] Int. Cl.[4] .................................................. B65G 47/24
[52] U.S. Cl. ...................................... 198/392; 198/397; 198/473.1
[58] Field of Search ............ 198/392, 397, 400, 473.1; 221/169, 170

[56] References Cited

U.S. PATENT DOCUMENTS

| 2,538,706 | 1/1951 | Reynolds et al. | 221/169 |
| 3,650,368 | 3/1972 | Nalbach | 198/397 |
| 4,130,194 | 12/1978 | Schindel et al. | 198/397 |
| 4,681,209 | 7/1987 | Marti | 198/392 |

Primary Examiner—Joseph E. Valenza
Attorney, Agent, or Firm—Anthony S. Zummer

[57] ABSTRACT

The disclosure describes an improved apparatus for orienting and feeding light weight articles, such as, empty plastic bottles. The apparatus includes a hopper for receiving and holding randomly positioned articles. A rotatable drum has a portion portioned below the hopper for receiving articles from the hopper. The drum has its axis of rotation offset from the vertical and rotates about its axis of rotation. A stationary shelf is positioned adjacent to the drum. A longitudinal conveyor is positioned adjacent to the drum for receiving articles from the drum. The improvement includes a plurality of removable chutes defining a portion of the drum. Each of the chutes intermittently communicates with the hopper for receiving articles of a given size from the hopper. The stationary shelf cooperates with each of the chutes for retaining articles in each of the chutes for a prescribed arc of rotation of the drum. A lock releasably holds the chutes in a selected position relative to the hopper. Release of the lock allows the chutes to be quickly removed and replaced by chutes of another size to handle articles of another size. The number of chutes of each size can be quickly varied to effect maximum efficiency of each of several different sizes of chutes.

23 Claims, 2 Drawing Sheets

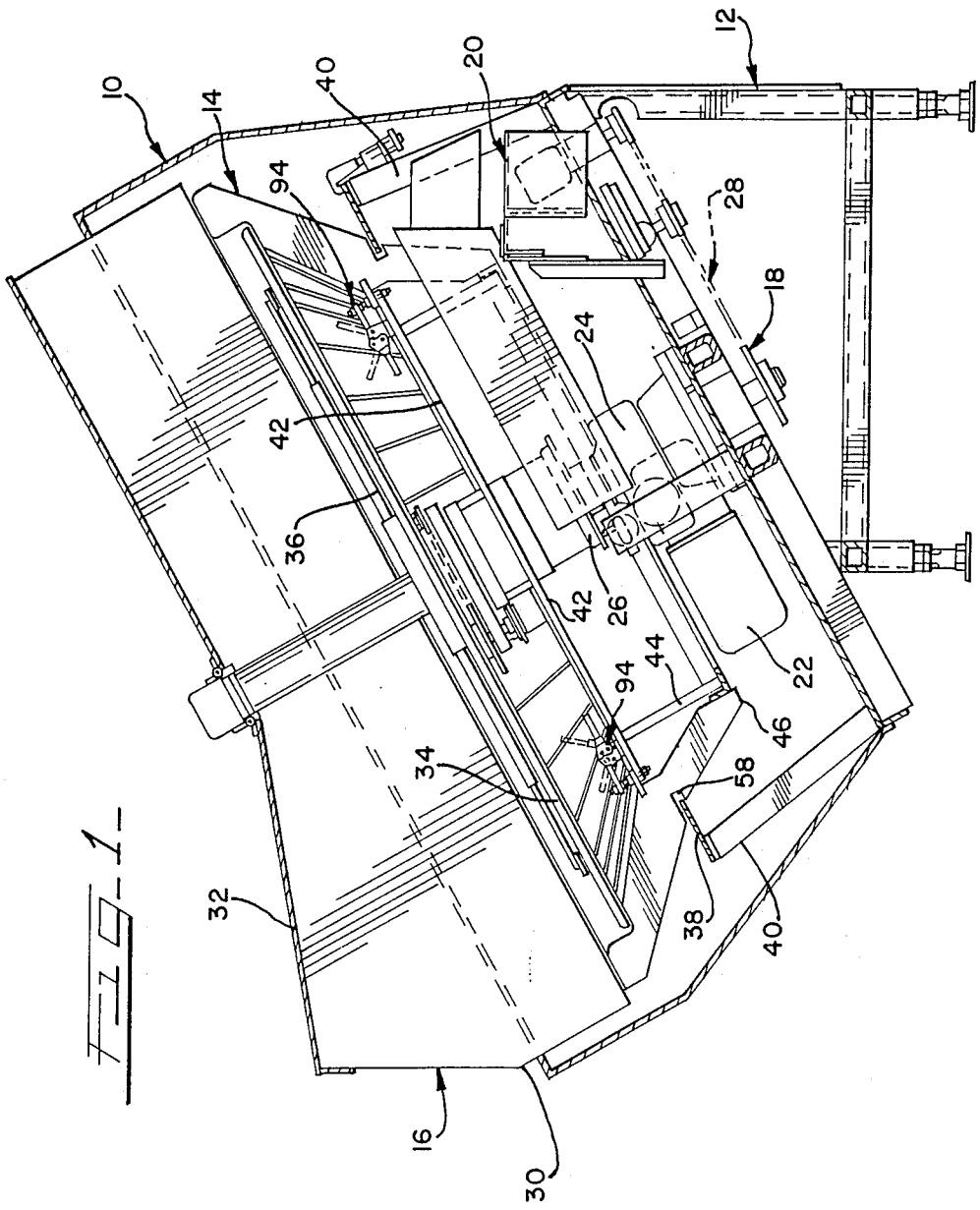

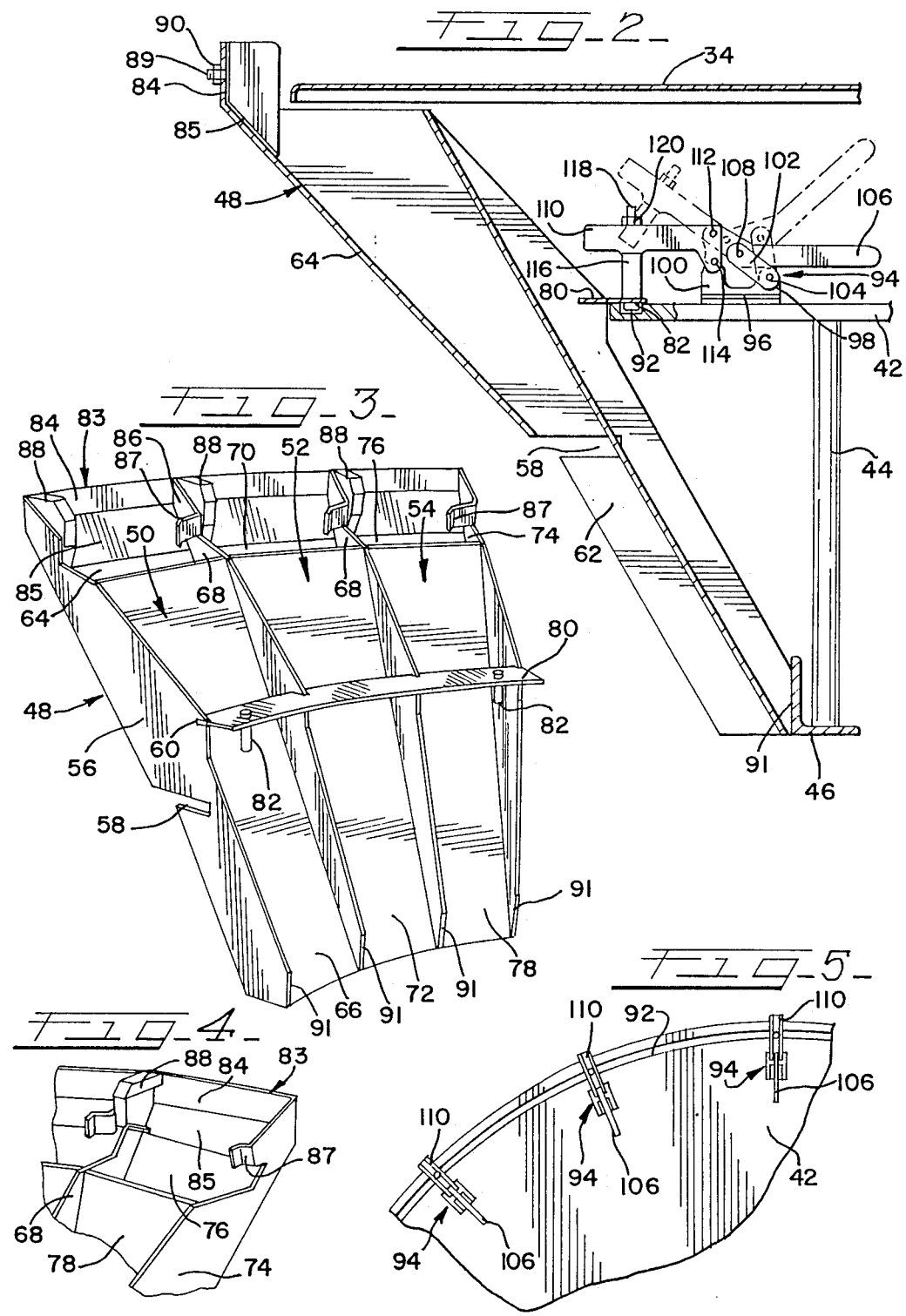

ARTICLE ORIENTING APPARATUS

BACKGROUND OF THE INVENTION

The use of plastic containers for packaging a variety of materials is widely accepted in many commercial areas. These containers are typically filled in automatic filling machines. For optimum operation of the filling machine, the containers must be in a vertical attitude and aligned in substantially a straight line for receipt of material from the filling machines. When the containers are manufactured by a typical well known process, such as, blow molding, the containers are delivered in a random arrangement. Thus, it is necessary to align the containers and arrange them in a vertical attitude. An unscrambling machine which has received a high degree of acceptance to perform this function is disclosed in U.S. Pat. No. 3,650,368, entitled, "Article Orienting Apparatus", issued Mar. 21, 1972, and invented by the inventor of the instant improvement, John C. Nalbach.

The patented article orienting apparatus has a plurality of chutes which constitute a portion of a rotating drum. Articles fall into the chutes for vertical alignment. The chutes are designed to receive articles of a given size for alignment. In order for the apparatus to orient articles of another size, it is necessary to remove the chutes and replace those chutes with chutes designed to accept and orient articles of another size. It is desirable to provide a construction wherein the chutes may be readily and quickly exchanged to accomodate chutes of different sizes. It may be appreciated that when the article orienting apparatus is not operating, an entire filling line is shut down. Thus, it is desirable to be able to remove chutes and replace them with a minimum of down time.

SUMMARY OF THE INVENTION

The present invention relates to an improved construction of an apparatus for orienting light weight articles. The subject apparatus includes a hopper for receiving and holding randomly positioned articles. The instant apparatus includes a rotatable drum having a portion positioned below the hopper. The drum has its axis of rotation offset from the vertical. Drive means are provided for rotating the drum about its axis of rotation. A stationary shelf is positioned adjacent to the drum and a conveyor is positioned adjacent to the drum for receiving the articles from the drum and carrying away articles aligned and positioned in a vertical attitude. The present improvement comprises a plurality of removable chutes defining a portion of the drum. Each of the chutes communicates with the hopper for receiving articles of a given size from the hopper. The stationary shelf is cooperative with each of the chutes for retaining an article in each of the chutes for a prescribed arc of rotation of the drum, and then allowing the article to be delivered to the conveyor in a vertical attitude and aligned. Locking means releasably lock the chutes in a selected position on the drum. Release of the locking means allows the removal and replacement of one set of chutes by another set of chutes of another size to handle light weight articles of another size or to provide a different number of chutes of a selected size.

BRIEF DESCRIPTION OF THE DRAWINGS

FIG. 1 is a cross sectional side elevational view of an article orienting apparatus embodying the herein disclosed invention;

FIG. 2 is an enlarged cross sectional view showing a chute in cross section and a hold down for releasably locking the chute to a chute disk plate;

FIG. 3 is a perspective view of a chute assembly;

FIG. 4 is a fragmentary perspective view of the chute assembly of FIG. 3 showing a bottle aligner assembly from another side; and FIG. 5 is a plan view of a portion of a chute disk plate with a plurality of toggle hold downs mounted on the plate.

DESCRIPTION OF THE PREFERRED EMBODIMENT

Referring now to the drawings, and especially to FIG. 1, an apparatus for orienting light weight articles, specifically a plastic bottle unscrambler, which is a specific embodiment of the subject invention, is generally indicated by numeral 10. The instant unscrambler includes a stationary base 12 which is of an ordinary and well known construction. A drum 14 is rotatably mounted on the base. As may be seen in FIG. 1, drum 14 is mounted on the base with its axis of rotation at 30° from the vertical. A conventional hopper 16 is mounted on the base above drum 14 for receiving and holding randomly arranged plastic bottles which are not shown herein. A conventional drive assembly 18 rotates drum 14 relative to the base and the hopper. A conventional longitudinal conveyor 20 is mounted on the base and is driven by drive assembly 18 in synchronism with the drum. Plastic bottles in the hopper enter the drum from which they are delivered to the longitudinal conveyor to be carried away from the unscrambler, as is conventional and well known.

Drive 18 includes a conventional electric motor 22 which is connected to a well known speed reducer 24. Reducer 24 is in turn connected to drum 14 through a clutch 26 to rotate the drum. The electric motor is also connected to familiar chain drive assembly 28 to drive longitudinal conveyor 20 and thereby keep the speed of the longitudinal conveyor synchronized with the rate of rotation of drum 14. Thus, plastic bottles leaving the drum are traveling at substantially the same rate as the longitudinal conveyor to reduce the likelihood of tipping of the bottles because of a change of momentum when the bottles leave the drum and are deposited on the longitudinal conveyor.

Hopper 16 includes a hopper wall 30 with a hopper cover 32 hingedly mounted thereon. The hopper includes a hopper floor 34 which is perpendicular to the drum's axis of rotation. An agitator 36 is rotatably mounted above the floor for moving plastic bottles toward the outer edge of the hopper floor for introduction into the rotating drum as is well understood in the art.

A conventional upper arcuate stationary shelf 38 is mounted on a plurality of shelf supports 40 which are supported by base 12. Shelf 38 is parallel to hopper floor 34. A second and well known lower shelf, which is not shown herein, is mounted below the drum to receive plastic bottles from the drum prior to delivery to the longitudinal conveyor. The construction of the parts of the unscrambler described above, except the drum, are described in detail in said U.S. Pat. No. 3,650,368.

The instant drum includes a flat circular chute disk plate 42 which has a plurality of chute side positioner spacers 44 mounted on the bottom thereof. The spacers 44 have fixed thereto a chute side positioner 46. A given set of removable chute assemblies 48 is releasably mounted on the chute disk plate 42. Each of the chute assemblies is identical in construction to each other chute assembly in the set.

The construction of each removable chute assembly 48 in the set may be best seen in FIGS. 2, 3 and 4. Each removable chute assembly has, in this instance, three individual identical chutes 50, 52 and 54. Each of the chutes is adapted to receive a separate plastic bottle. Chute 50 is made up of a chute side wall 56 which has a shelf groove 58 formed in one edge. A ledge slot 60 is formed in an opposed edge of side wall 56. The other side of chute 50 is defined by an interior side wall 62 which is identical to side wall 56. Side wall 62 has a shelf groove and a ledge slot which are aligned with the shelf groove and the ledge slot of side wall 56, respectively. An outside wall 64 extends between the upper portion of side wall 56 and side wall 62 and terminates at the shelf grooves of those two side walls. An inside wall 66 between the side walls 56 and 62 extends substantially the entire length of side walls 56 and 62.

Chute 52 is defined by the inner side wall 62 and an inner side wall 68 which is identical in construction to side wall 62. The side walls 62 and 68 have shelf grooves which are aligned and ledge slots which are also aligned. An outside wall 70, which is substantially identical to outside wall 64, extends between side walls 62 and 68 to the shelf grooves of those side walls. An inside wall 72, which is substantially identical to inside wall 66, is fixed between the side walls 62 and 68.

Chute 54 is formed by inner side wall 68 and an outer side wall 74, which is identical in construction to outer side wall 56. Side walls 68 and 74 have aligned shelf grooves and aligned ledge slots. An outside wall 76, which is substantially identical to the other two outside walls, extends between the side wall 68 and side wall 74 from the upper portion of the side walls to the shelf grooves of the side walls. An inside wall 78, which is substantially identical to the other two inside walls, is fixed between the side walls 68 and 74. An arcuate mounting ledge 80 is fixed in ledge slots of side walls 56, 62, 68 and 74. The mounting ledge has a pair of positioning pins 82 fixed to the lower side thereof for cooperation with the chute disk plate to lock the chute assembly in a selected location on the chute disk plate.

Each of the chutes has an identical bottle aligner unit 83 mounted in its upper end positioned between the respective side walls. Each bottle aligner unit 83 includes a back wall 84 with a sloping wall 85 formed integral therewith. A perpendicular end 86 is fixed to one end and a bottle rest 87 is formed integral with end 86. A bottle stop end receptacle 88 is fixed to the other end of the back wall and the sloping wall. A pair of mounting studs 89 is fixed to back wall 84 and conventional nuts 90 secure the aligned unit in place. The bottle aligner units cause plastic bottles entering each chute to drop down into the chute bottom first as is well known.

Each side wall includes a foot 91 which is in engagement with the chute side positioner to hold the removable chute assembly in a selected attitude relative to the hopper floor.

The chute disk plate has an annular locating pin groove 92 positioned along its outer periphery. Positioning pins 82 are mounted in the pin groove to locate the chute assembly on the chute disk plate. The arcuate mounting ledge conforms to the outer periphery of the chute disk plate.

A toggle hold down 94 engages each of the arcuate mounting ledges to hold the positioning pins in pin groove 92. Each hold down includes a U-shaped base 96 fixed to the chute disk plate. Base 96 has a lower ear 98 on one end and an upper ear 100 on the other end. A link 102 is pivotally connected to lower ear 98 through a pin 104. A handle 106 is pivotally connected to link 102 through a pin 108. The handle is also pivotally connected to a lock arm 110 through a pin 112. The lock arm is pivotally connected to ear 100 through a pin 114. The lock arm has a post 116 mounted thereon with a threaded end 118 extending therethrough and a nut 120 holding threaded end 118 in place. The hold down has a conventional toggle arrangement whereby application of downward force to the handle as viewed in FIG. 2 causes post 116 to engage the arcuate mounting ledge to hold the ledge against movement upward and thereby lock ledge 80 to the chute disk plate. In order to release the ledge, it is only necessary to pivot handle 106 upward to the dotted position shown in FIG. 2, and thereby pivot post 116 upward to allow the pins 82 to be lifted out of pin groove 92, and thereby release the removable chute assembly from the chute disk plate.

As is well known and described in detail in U.S. Pat. No. 3,650,368, the unscrambler works in the following manner whereby the drum has plastic bottles drop into bottle aligner units 83 and into each of the chutes. As the drum rotates, the bottles drop down into the upper portion of each chute and are held there by the stationary shelf. Further rotation of the drum allows the bottles to drop down to a lower shelf which is not shown herein since it is well known as described in the aforementioned U.S. Pat. No. 3,650,368. Further rotation of the drum carries the plastic bottles along the lower shelf to a point where the plastic bottles are delivered to the longitudinal conveyor so that the bottles are in an upright attitude and are in line for filling by a conventional filling machine.

When it is necessary for the filling machine to fill a bottle of a different size, the instant unscrambler will not handle those bottles. It follows that it is necessary to remove the set of chutes which are built to handle bottles of the one size and replace that set with chutes which are built to handle bottles of the required size. With the present construction, the set of chute assemblies may be quickly and easily replaced. The chute assemblies may be easily removed. It is only necessary to raise handle 106 so that post 116 is disengaged from the arcuate mounting ledge. The complete removable chute assembly may be easily accomplished by lifting the chute assembly from the chute disk plate and thereby remove it from the remainder of the apparatus. The remaining chute assemblies of the set are removed in like manner.

A set of chute assemblies have chutes of the desired size then may be installed in the unscrambler. A removable chute assembly having chutes of a different size for handling plastic bottles of the desired size may be easily installed by placing positioning pins on the mounting ledge in the pin groove to locate the chute assembly on the chute disk plate. The mounting ledge is locked to the chute disk plate by pushing down on handle 106 so that post 116 engages the ledge. The toggle assembly of the hold down locks the handle in its down position. It may be further appreciated that feet 91 of the side walls abut the chute side positioner. The center of gravity of the chute assembly is away from the center of the chute disk plate so that the removable chute assembly tends to pivot about the positioning pins and feet 91 are held against the chute side positioner. Thus, the removable chute assemblies are firmly positioned in their respective locations and are locked into place by the respective hold downs.

The present construction allows plastic bottles of one size to be handled by the unscrambler. When it is desirable for the unscrambler to handle plastic bottles of another size, it is a simple matter to release the hold downs, remove the removable chute assemblies, and substitute chute assemblies of another size in their stead so that plastic bottles of another size may be handled by the unscrambler. The present arrangement of parts is such that the change may be made quickly and efficiently with a minimum of down time for the unscrambler and therefore a minimum of down time for a filling line. It is evident that the radial position of the chutes may be selectively randomly located since the pins 82 on a chute assembly are positioned in groove 92. This construction allows the number of chute assemblies mounted on the chute disk plate to be varied. For example, eleven chute assemblies of two chutes each can be replaced by ten chute assemblies of three chutes each, thus there is an increase of output without increasing the rate of rotation. It follows that the present construction provides a machine which has a high degree of flexibility with a minimum of down time for making conversions.

Although a specific embodiment of the herein disclosed invention has been shown in the accompanying drawings and described in the specification above, it is readily apparent that those skilled in the art may make various modifications and changes without departing from the spirit and scope of the present invention. It is to be expressly understood that the invention is limited only by the appended claims.

I claim:

1. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, said plurality of removable chutes being replaceable by a second plurality of removable replacement chutes being a different number of replacement chutes than the number of removable chutes in the first mentioned plurality of removable chutes, each of said replacement chutes being communicatable with the hopper and receive articles from the hopper and cooperative with the stationary shelf for having articles retained in each of the replacement chutes for a prescribed arc of rotation of the drum, and means selectively releasably locking removable chutes and replacement chutes in selected respective locations, whereby release of said means releasably locking the chutes allows the first mentioned removable chutes to be removed and replaced by replacement chutes of a selected number and a selected size for handling a selected number and size of light weight articles.

2. In an apparatus for orienting light weight articles as defined in claim 1, including, a chute disk plate connected to the drum for rotation therewith, said chute disk plate supporting the removable chutes.

3. In an apparatus for orienting light weight articles as defined in claim 1, including; a mounting ledge connected to each of said removable chutes and being cooperative with said means for releasably locking the chutes in a selected location.

4. In an apparatus for orienting light weight articles as defined in claim 1, including; a mounting ledge connected to each of the chutes and cooperative with the means for releasably locking the chutes in a selected location, and a positioning pin connected to each mounting ledge for locating the respective ledge and the connected chute.

5. In an apparatus for orienting light weight articles as defined in claim 1, including; a chute side positioner cooperative with a lower portion of the removable chutes for positioning the chutes relative to the hopper.

6. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, means releasably locking the chutes in a selected location, and said means releasably locking the chutes in a selected location includes a toggle hold down, whereby release of said means releasably locking the chutes allows the chutes to be removed and replaced by chutes of a selected number and a selected size for handling a selected number and size of light weight articles.

7. In an apparatus for orienting light weight articles as defined in claim 1, including; a chute disk plate connected to the drum for rotation therewith, and a mounting ledge connected to each removable chute and cooperative with the means for releasably locking the chutes in a selected location to be releasably secured to the chute disk plate.

8. In an apparatus for orienting light weight articles as defined in claim 1, including; a chute disk plate connected to the drum for rotation therewith, said chute disk plate having a pin groove, a mounting ledge connected to each removable chute, and a positioning pin fixed to each mounting ledge and being positionable in the pin groove to locate selectively each mounting ledge relative to the chute disk plate, and said means releasably locking the chutes in a randomly selected radial location releasably connecting the mounting ledge to the chute disk plate.

9. In an apparatus for orienting light weight articles as defined in claim 1, including; a chute disk plate connected to the drum for rotation therewith, and a chute side positioner connected to the chute disk plate and being cooperative with the plurality of removable chutes for positioning the chutes relative to the hopper.

10. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, a chute disk plate connected to the drum for rotation therewith, means releasably locking the chutes in a selected location, and said means releasably locking the chutes in a selected location including a plurality of toggle hold downs releasably connecting the chutes to the chute disk plate, whereby release of said means releasably locking the chutes allows the chutes to be removed and replaced by chutes of a selected number and a selected size for handling a selected number and size of light weight articles.

11. In an apparatus for orienting light weight articles as defined in claim 1, including; a chute disk plate connected to the drum for rotation therewith, a mounting ledge connected to each removable chute, a positioning pin locating each mounting ledge relative to the chute disk plate, and a chute side positioner connected to the chute disk plate and being cooperative with the removable chutes for positioning the lower portion of the chutes.

12. In an apparatus for orienting light weight articles comprising; a hopper for receiving a holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, a chute disk plate connected to the drum for rotation therewith, said chute disk plate having a pin groove, a mounting ledge connected to each removable chute, a positioning pin fixed in each mounting ledge and being removably positionable in the pin groove for selectively locating the mounting ledge relative to the chute disk plate, means releasably locking the chutes in a selected location, and said means releasably locking the chutes in a selected location including a toggle hold down mounted on the chute disk plate and being releasably connectable to the mounting ledge for releasably locking the mounting ledge to the chute disk plate, whereby release of said means releasably locking the chutes allows the chutes to be removed and replaced by chutes of a selected number and a selected size for handling a selected number and size of light weight articles.

13. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned to adjacent to the drum for receiving light weight articles from the drum, the improvement comprising; a plurality of removably chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, means releasably locking the chutes in a selected location, a chute side positioner cooperative with the lower portion of the removable chutes for positioning the chutes relative to the hopper, and said means releasably locking the chutes in a selected location including a toggle hold down, whereby release of said means releasably locking the chutes allows the chutes to be removed and replaced by chutes of a selected number and a selected size for handling a selected number and size of light weight articles.

14. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, means releasably locking the chutes in a selected location, a chute disk plate connected to the drum for rotation therewith, a mounting ledge connected to each removable chute, a chute side positioner connected to and positioned below the chute disk plate and being engageable with the removable chutes for positioning the chutes relative to the hopper, and said means releasably locking the chutes in a selected location including a toggle hold down mounted on the chute disk plate holding a respective mounting ledge in releasable connection to the chute disk plate, whereby release of said means releasably locking the chutes allows the chutes to be removed and replaced by chutes of a selected number and a selected size for handling a selected number and size of light weight articles.

15. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, a chute disk plate connected to the drum for rotation therewith, said chute disk plate having an annular pin groove adjacent to its outer periphery, a mounting ledge connected to each of the removable chutes, a positioning pin fixed to each of the mounting ledges and being positionable in the pin groove for locating the respective removable chute relative to the chute disk plate, a chute side positioner connected to the chute disk plate and being positioned below the chute disk plate, means releasably locking the chutes in a selected location, and said means for releasably locking the chutes in a selected location including a plurality of toggle hold downs mounted on the chute disk plate and being engageable with respective mounting ledges for releasably holding the mounting ledges onto the chute disk plate, whereby release of said means releasably locking the chutes allows the chutes to be removed and replaced by chutes of a selected number and a selected size for handling a selected number and size of light weight articles.

16. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, a flat chute disk plate having a circular outer periphery connected to the drum for rotation therewith, said chute disk plate having an annular pin groove adjacent to its outer periphery, each of said removable chutes being made up of a chute assembly, each of said chute assemblies having at least a pair of chutes having a common chute wall, a mounting ledge fixed to each of the chute assemblies, a positioning pin fixed to each of the mounting ledges and being positionable in a pin groove for locating each chute assembly relative to the chute disk plate, means releasably locking the chutes in a selected location, and said means releasably locking the chutes in a selected location including a plurality of toggle hold downs mounted on the chute disk plate and being engageable with respective mounting ledges for releasably holding the chute assemblies onto the chute disk plate, whereby release of said means releasably locking the chutes allows the chutes to be removed and replaced by chutes of a selected number and a selected size for handling a selected number and size of light weight articles.

17. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, a chute disk plate connected to the drum for rotation therewith, said chute disk plate having a continuous pin groove adjacent to its outer periphery, said plurality of removable chutes comprising a plurality of removable chute assemblies, each of said chute assemblies having at least a pair of chutes having a common chute wall, a mounting ledge connected to each of the removable chute assemblies, a positioning pin fixed to each of the mounting ledges and being positionable in a pin groove for locating each removable chute assembly relative to the chute disk plate, a chute side positioner connected to the chute disk plate and being positioned below the chute disk plate, said chute side positioner engaging the chute assemblies to position the chutes relative to the hopper, and means releasably locking the chutes in a selected location, whereby release of said means releasably locking the chutes allows the chutes to be removed and replaced by chutes of a selected number and a selected size for handling a selected number and size of light weight articles.

18. In an apparatus for orienting light weight articles comprising; a hopper for receiving and holding randomly positioned light weight articles, a rotatable drum having a portion positioned below the hopper, said drum having its axis of rotation offset from the vertical, means for rotating said drum about its axis of rotation, a stationary shelf positioned adjacent to the drum, a conveyor positioned adjacent to the drum for receiving light weight articles from the drum, the improvement comprising; a plurality of removable chutes defining a portion of the drum, each of said chutes communicating with the hopper for receiving articles of a given size from the hopper, said stationary shelf cooperative with each of the chutes for retaining articles in each of the chutes for a prescribed arc of rotation of the drum, a circular chute disk plate connected to the drum for rotation therewith, said chute disk plate having an annular pin groove adjacent to its outer periphery, said plurality of removable chutes comprising a plurality of removable chute assemblies, each of said chute assemblies having three chutes, an arcuate mounting ledge fixed to each removable chute assembly, a pair of positioned pins fixed to each of the mounting ledges and being positionable in the pin groove for positioning each removable chute assembly relative to the chute disk plate in a random radial location, a chute side positioner connected to the chute disk plate and being positioned below the chute disk plate, said chute side positioner engaging the chute assemblies to position the chute relative to the hopper, means releasably locking the chutes in a selected location, and said means for releasably locking the chutes in a selected location including a plurality of toggle hold downs mounted on the chute disk plate and being engageable with respective mounting ledges for holding the mounting ledges onto the chute disk plate in a randomly selected radial location, whereby release of said means releasably locking the chutes allows the chutes to be removed and replaced by chutes of a selected number and a selected size for handling a selected number and size of light weight articles.

19. A chute assembly for use in an apparatus for orienting light weight articles comprising; a plurality of identical side walls, each of said side walls having a shelf groove on one edge and a ledge slot on an opposed edge, an outside wall positioned between each of a pair of adjacent side walls, said outside wall extending from an upper portion of the side walls to the shelf grooves, an inside wall extending between each pair of adjacent side walls and extending substantially the entire length of the side walls, and a mounting ledge positioned in the ledge slots and being fixed relative to the side walls to provide a means for securing the chute assembly to a portion of a drum of an apparatus for orienting light weight articles.

20. A chute assembly as defined in claim 19, including a positioning pin fixed to the mounting ledge for locating and holding the chute assembly relative to a portion of the drum.

21. A chute assembly as defined in claim 19, wherein each of said side walls has a foot on its lower portion adjacent to the inside wall, and including; a bottle aligner unit connected to each pair of adjacent side walls for aligning a light weight plastic bottle as the bottle moves downward between the outside wall and the respective inside wall.

22. A chute assembly as defined in claim 19, wherein each of said side walls has a foot on its lower portion adjacent to the inside wall, and including; a positioning pin fixed to the mounting ledge for locating and holding the chute assembly relative to a portion of the drum, and a bottle aligner unit connected to each pair of adjacent side walls for aligning a light weight plastic bottle as the bottle moves downward between the outside wall and the respective inside wall.

23. A chute assembly as defined in claim 19, wherein each of said side walls has a foot on its lower portion adjacent to the inside wall, said plurality of side walls being four forming three identical chutes, said mounting ledge being arcuate, and including; a pair of positioning pins fixed to the mounting ledge for locating and holding the chute assembly relative to a portion of the drum, and a bottle aligner unit connected to each pair of adjacent side walls for aligning a light weight plastic bottle as the bottle moves downward in the respective chute.

* * * * *

UNITED STATES PATENT AND TRADEMARK OFFICE
CERTIFICATE OF CORRECTION

PATENT NO. : 4,865,181
DATED : Sep. 12, 1989
INVENTOR(S) : John C. Nalbach

It is certified that error appears in the above-identified patent and that said Letters Patent is hereby corrected as shown below:

Claim 12, Column 7, Line 39, after the word "receiving" cancel "a" and substitute therefor --and--.

Claim 13, Column 8, Line 8, cancel the first recitation of "to".

Claim 13, Column 8, Line 10, cancel "removably" and substitute therefor --removable--.

Signed and Sealed this

Twenty-fourth Day of July, 1990

Attest:

HARRY F. MANBECK, JR.

*Attesting Officer*     *Commissioner of Patents and Trademarks*